United States Patent
Cook (10) Patent No.: US 10,827,673 B2
(45) Date of Patent: Nov. 10, 2020

(54) CENTER KNIFE DRIVE FOR AN AGRICULTURAL HARVESTER

(71) Applicant: CNH Industrial America LLC, New Holland, PA (US)

(72) Inventor: Joel Cook, Lilitz, PA (US)

(73) Assignee: CNH Industrial America LLC, New Holland, PA (US)

( * ) Notice: Subject to any disclaimer, the term of this patent is extended or adjusted under 35 U.S.C. 154(b) by 180 days.

(21) Appl. No.: 15/852,105

(22) Filed: Dec. 22, 2017

(65) Prior Publication Data

US 2019/0191625 A1 Jun. 27, 2019

(51) Int. Cl.

| A01D 34/32 | (2006.01) |
| A01D 34/30 | (2006.01) |
| A01D 34/14 | (2006.01) |
| A01D 69/06 | (2006.01) |

(Continued)

(52) U.S. Cl.
CPC .......... *A01D 34/32* (2013.01); *A01D 34/145* (2013.01); *A01D 34/305* (2013.01); *A01D 69/06* (2013.01); *A01D 34/04* (2013.01); *A01D 61/02* (2013.01)

(58) Field of Classification Search
CPC ...... A01D 34/32; A01D 34/305; A01D 69/06; A01D 34/145; A01D 61/02; A01D 34/04; A01D 34/135; A01D 34/30; A01D 34/14; A01D 34/142; A01D 34/02; Y10T 74/18208; Y10T 74/18528; B21D 53/28; F16H 21/18

See application file for complete search history.

(56) References Cited

U.S. PATENT DOCUMENTS

| 2,808,696 A * | 10/1957 | Hall ..................... A01D 34/305 56/296 |
| 3,941,003 A * | 3/1976 | Garrison ................ A01D 34/30 74/44 |
| 4,023,334 A | 5/1977 | Heath |

(Continued)

FOREIGN PATENT DOCUMENTS

| CN | 107736122 A | 2/2018 | |
| DE | 202011106656 U1 * | 12/2011 | ............. A01D 34/16 |

(Continued)

OTHER PUBLICATIONS

Extended European Search Report for European Patent Convention application No. 18203389.4, dated Jun. 4, 2019 (15 pages).

*Primary Examiner* — Arpad Fabian-Kovacs
(74) *Attorney, Agent, or Firm* — Peter Zacharias; Patrick Sheldrake (57) ABSTRACT

A header for an agricultural harvester comprising a frame and an epicyclical drive supported by the frame. The epicyclical drive includes a first rotatable wheel having a first substantially vertical rotational axis and a first disk. The first disk includes a first eccentric axis rotatable about the first rotational axis. The epicyclical drive further includes a second rotatable wheel having a second substantially vertical rotational axis and a second disk. The second disk includes a second eccentric axis rotatable about the second rotational axis. The header further includes a first cutter bar directly connected to the first disk and a second cutter bar directly connected to the second disk. Operation of the epicyclical drive results in substantially linear oscillating motion of the cutter bars.

20 Claims, 4 Drawing Sheets

(51) Int. Cl.
*A01D 34/04* (2006.01)
*A01D 61/02* (2006.01)

(56) References Cited

U.S. PATENT DOCUMENTS

| | | | |
|---|---|---|---|
| 4,866,921 A | 9/1989 | Nagashima et al. | |
| 4,901,512 A | 2/1990 | Castoldi | |
| 4,909,025 A * | 3/1990 | Reissig | A01D 34/305 |
| | | | 56/257 |
| 5,497,605 A | 3/1996 | Underwood et al. | |
| 6,216,429 B1 | 4/2001 | McCredie | |
| 6,598,299 B2 * | 7/2003 | Stark | A01G 3/053 |
| | | | 30/216 |
| 6,698,177 B1 * | 3/2004 | Akehi | B21D 53/28 |
| | | | 56/236 |
| 6,889,492 B1 | 5/2005 | Polk et al. | |
| 7,121,074 B1 * | 10/2006 | Regier | A01D 34/305 |
| | | | 56/296 |
| 7,401,458 B2 | 7/2008 | Priepke | |
| 7,520,118 B1 | 4/2009 | Priepke | |
| 7,730,709 B2 | 6/2010 | Priepke | |
| 7,757,405 B2 * | 7/2010 | Peterson | A01G 3/053 |
| | | | 30/216 |
| 7,805,919 B2 | 10/2010 | Priepke | |
| 8,011,272 B1 | 9/2011 | Bich et al. | |
| 8,151,547 B2 | 4/2012 | Bich et al. | |
| 8,667,697 B2 * | 3/2014 | Hittmann | A01G 3/053 |
| | | | 30/277.4 |
| 8,973,345 B2 * | 3/2015 | Brimeyer | A01D 34/30 |
| | | | 56/257 |
| 9,545,051 B2 * | 1/2017 | Cook | A01D 34/145 |
| 9,668,407 B2 * | 6/2017 | Cook | A01D 34/145 |
| 9,924,635 B1 * | 3/2018 | Lopez | A01D 34/04 |
| 10,212,884 B2 * | 2/2019 | Webermann | A01D 41/142 |
| 2008/0148701 A1 * | 6/2008 | Priepke | A01D 34/145 |
| | | | 56/17.6 |
| 2009/0145097 A1 * | 6/2009 | Priepke | A01D 34/30 |
| | | | 56/257 |
| 2009/0145264 A1 * | 6/2009 | Priepke | A01D 34/30 |
| | | | 74/84 R |
| 2011/0078989 A1 * | 4/2011 | Bich | A01D 34/145 |
| | | | 56/14.5 |
| 2014/0007717 A1 * | 1/2014 | Kato | A01G 3/053 |
| | | | 74/49 |
| 2014/0130472 A1 * | 5/2014 | Cook | A01D 34/30 |
| | | | 56/16.4 R |
| 2014/0318094 A1 * | 10/2014 | Cook | A01D 34/30 |
| | | | 56/10.1 |
| 2014/0345239 A1 * | 11/2014 | Cook | A01D 34/145 |
| | | | 56/10.1 |
| 2015/0163994 A1 * | 6/2015 | Bich | A01D 34/14 |
| | | | 56/299 |
| 2015/0305233 A1 * | 10/2015 | Surmann | A01D 34/135 |
| | | | 56/10.1 |
| 2017/0086368 A1 * | 3/2017 | Cook | A01D 34/30 |
| 2017/0105344 A1 * | 4/2017 | Webermann | A01D 41/142 |
| 2017/0118909 A1 * | 5/2017 | Schumacher | A01D 69/12 |
| 2017/0265383 A1 * | 9/2017 | Cook | A01D 34/145 |
| 2019/0357438 A1 * | 11/2019 | Zumbach | A01D 34/135 |

FOREIGN PATENT DOCUMENTS

| | | |
|---|---|---|
| EP | 2382852 A2 | 11/2011 |
| EP | 1890529 B1 | 3/2013 |
| WO | WO2012166666 | 12/2012 |

* cited by examiner

CENTER KNIFE DRIVE FOR AN AGRICULTURAL HARVESTER

The exemplary embodiments of present invention relate generally to a header of a plant cutting machine (e.g., a combine harvester) and, more specifically, to a header having an epicyclical drive directly connected to and driving a cutter bar.

BACKGROUND OF THE DISCLOSURE

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they are collected inside the header and transported via a conveyor such as a draper belt towards a feederhouse located centrally inside the header.

Epicyclical cutter bar knife drives oscillate first and second sickle mechanisms of cutter bars in opposite directions in order to cut crop. However, conventional epicyclical knife drives generate detrimental moments and/or other forces that can lead to stresses in the knife drives as well as at the connections of the driver elements to the cutter bar.

BRIEF SUMMARY OF THE DISCLOSURE

In accordance with an exemplary embodiment there is provided a header for an agricultural harvester comprising a frame and an epicyclical drive supported by the frame. The epicyclical drive includes a first rotatable wheel having a first substantially vertical rotational axis and a first disk. The first disk has a first eccentric axis rotatable about the first substantially vertical rotational axis, wherein operation of the epicyclical drive results in oscillating motion of the first disk in a direction transverse to the first substantially vertical rotational axis. A first cutter bar is directly connected to the first disk extending in a direction substantially transverse to the first substantially vertical rotational axis. The oscillating motion of the first disk is in line with a longitudinal axis of the first cutter bar.

In accordance with the exemplary embodiment, the epicyclical drive further includes a second rotatable wheel having a second substantially vertical rotational axis, and a second disk. The second disk has a second eccentric axis rotatable about the second substantially vertical rotational axis, wherein operation of the epicyclical drive results in oscillating motion of the second disk in a direction transverse to the second substantially vertical rotational axis. A second cutter bar is directly connected to the second disk extending in a direction substantially transverse to the second substantially vertical rotational axis. The oscillating motion of the second disk is in line with a longitudinal axis of the second cutter bar.

An aspect of the exemplary embodiment is that the first and second disks are configured to oscillate in opposing directions and in a direction along a single plane. Further, the second substantially vertical rotational axis is parallel to and spaced from the first substantially vertical rotational axis. In addition, the second rotatable wheel is adjacent the first rotatable wheel and the first rotatable wheel is adjacent to the first cutter bar.

Another aspect of the exemplary embodiment is that the first substantially vertical rotational axis of the first rotatable wheel is parallel to the first eccentric axis of the first disk, and the second substantially vertical rotational axis of the second rotatable wheel is parallel to the second eccentric axis of the second disk. Additionally, the first eccentric axis is substantially vertical and the epicyclical drive faces an upwardly direction.

Another aspect of the exemplary embodiment is that the epicyclical drive is mounted centrally along the frame. A further aspect of the exemplary embodiment is that the epicyclical drive includes a drive mechanism extending between and operatively engaged with the first and second rotatable wheels. The drive mechanism includes a drive shaft that engages a first driven gear operatively connected to the first rotatable wheel and a second driven gear operatively connected to the second rotatable wheel.

Another aspect of the exemplary embodiment is that the header includes a central cutter bar adjacent the epicyclical drive. The central cutter bar has a longitudinal extent greater than a width of the epicyclical drive and positioned between the first and second cutter bars.

Another aspect of the exemplary embodiment is that the header includes a conveyor supported by the frame, and the epicyclical drive is positioned between the first and second cutter bars and the conveyor. The conveyor can be in infeed conveyor or a lateral draper conveyor.

In accordance with the exemplary embodiments of the present disclosure, there is provided an epicyclical knife drive disk that is directly connected to the cutter bar. When the exemplary embodiments are used in combination with an agricultural harvester, the exemplary embodiments overcome one or more of the disadvantages of conventional harvesters by providing a header having an epicyclical knife drive connected directly to the elongate cutter bar, thereby eliminating intervening structure(s) between the knife drive and the cutter bar as well as detrimental stresses associated with such structures. In addition, the assembly has less mass and is lighter in weight which is advantageous as the combine requires less energy to lift the header, and there is less mass to float on the ground thereby reducing the likelihood of the cutter bars digging into the ground during operation.

Other features and advantages of the subject disclosure will be apparent from the following more detail description of the exemplary embodiments.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DISCLOSURE

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 1:
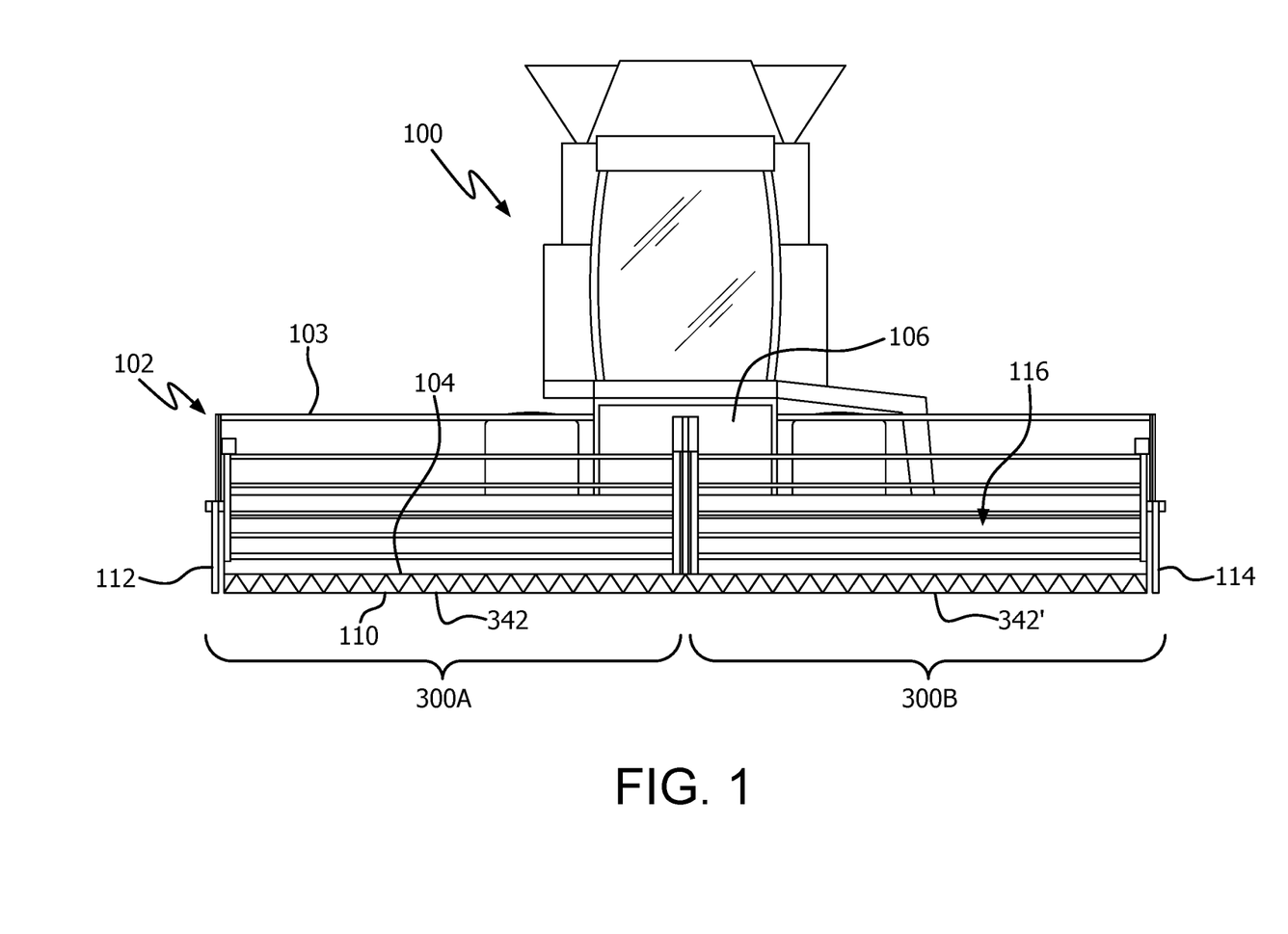
FIG. 1 is a front elevation view of an agricultural harvester including a header in accordance with an exemplary embodiment of the subject disclosure.

Referring now to the drawings, FIG. 1 illustrates an agricultural harvester 100 in accordance with an exemplary embodiment of the present disclosure. For exemplary purposes only, the agricultural harvester is illustrated as a combine harvester. The harvester 100 includes a header 102 attached to a forward end of the harvester 100, which is configured to cut crops, including (without limitation) small grains (e.g., wheat, soybeans, grain, etc.), and to induct the cut crops into a feederhouse 106 as the harvester moves forward over a crop field.

The header 102 includes a frame 103 having a floor 104 that is supported in desired proximity to the surface of a crop field. First and second cutting assemblies 200A, 200B extend transversely along a forward edge of the floor 104 i.e., in a widthwise direction of the harvester. The first and second cutting assemblies 300A, 300B, described in greater detail hereinafter, are configured to cut crops in preparation for induction into the feederhouse 106. The header may include one or more draper conveyor belts for conveying cut crops to the feederhouse 106, which is configured to convey the cut crops into the harvester for threshing and cleaning as the harvester moves forward over a crop field. The header 102 can further include an elongated, rotatable reel 116 which extends above and in close proximity to the first and second cutting assemblies 300A, 300B. The rotatable reel 116 is configured to cooperate with one or more draper conveyors in conveying cut crops to the feederhouse 106 for threshing and cleaning. While the foregoing aspects of the harvester are being described with respect to the header shown, the cutting assembly of the subject application can be applied to any other header having use for such a cutting assembly.

The cutting assemblies 300A, 300B extend along a forward edge 110 of the floor 104, and are generally bounded by a first side edge 112 and an opposing second side edge 114, both adjacent to the floor.

According to an exemplary embodiment as shown in FIG. 1, the cutting assemblies 300A, 300B include a first cutter bar 342 and a second cutter bar 342'. The cutting assemblies 300A, 300B are driven by a knife drive assembly 320, unillustrated in FIG. 1 but described below, that drives cutter knife heads 341, 341' in oscillating motion whereby the knife heads move laterally to the left and right. Additional exemplary cutter knife heads applicable to the present exemplary embodiments are disclosed e.g., in U.S. Pat. Nos. 7,730,709 and 8,151,547, the entire disclosures of which are incorporated by reference herein in their entirety for all purposes.

Figure 3:
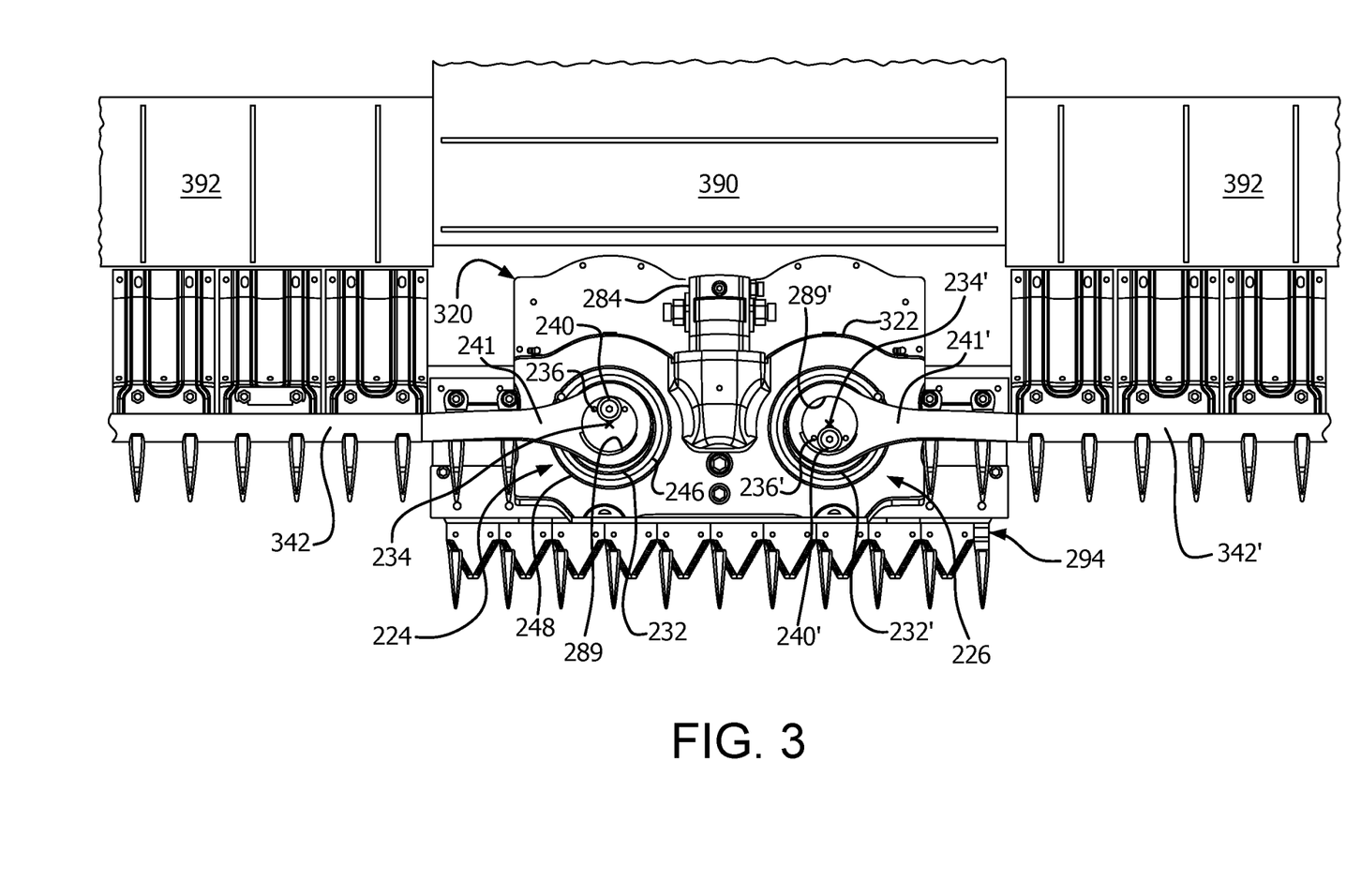
FIG. 3 is a top plan view of a portion of a header in accordance with an exemplary embodiment of the subject disclosure including cutter bars and the knife drive assembly of FIG. 2.
Figure 4:
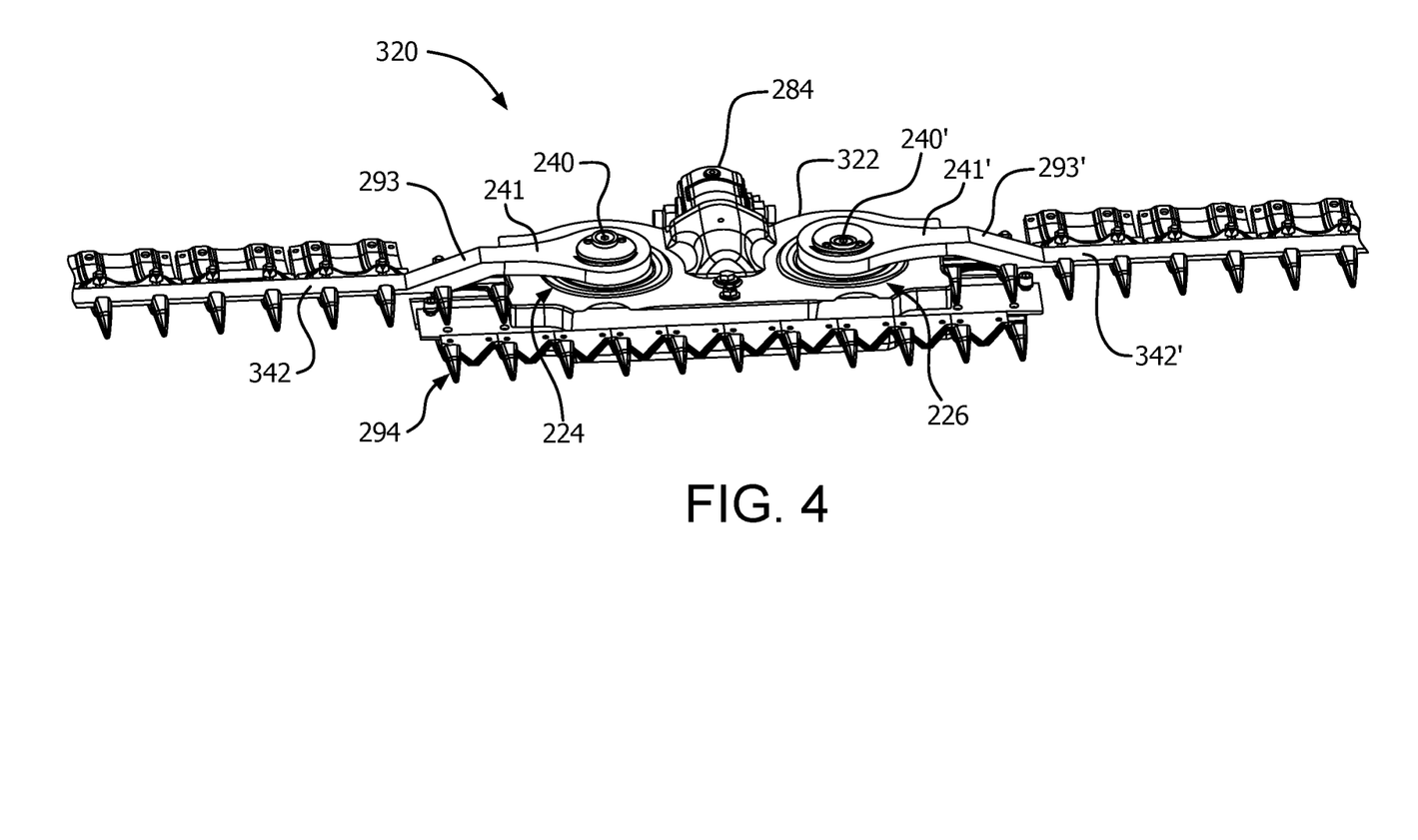
FIG. 4 is a top perspective view of a header in accordance with an exemplary embodiment of the subject disclosure including cutter bars and the knife drive assembly of FIG. 2 with certain elements of the header omitted for clarity of illustration.

Referring to FIGS. 3 and 4, the knife drive assembly 320 includes a housing 322 that houses a pair of epicyclical drives 224, 226 that convert rotational motion to oscillating motion in a manner described in more detail below. The first and second epicyclical drives 224, 226 are indirectly mounted to the header frame 103 by virtue of the housing 222.

Figure 2:
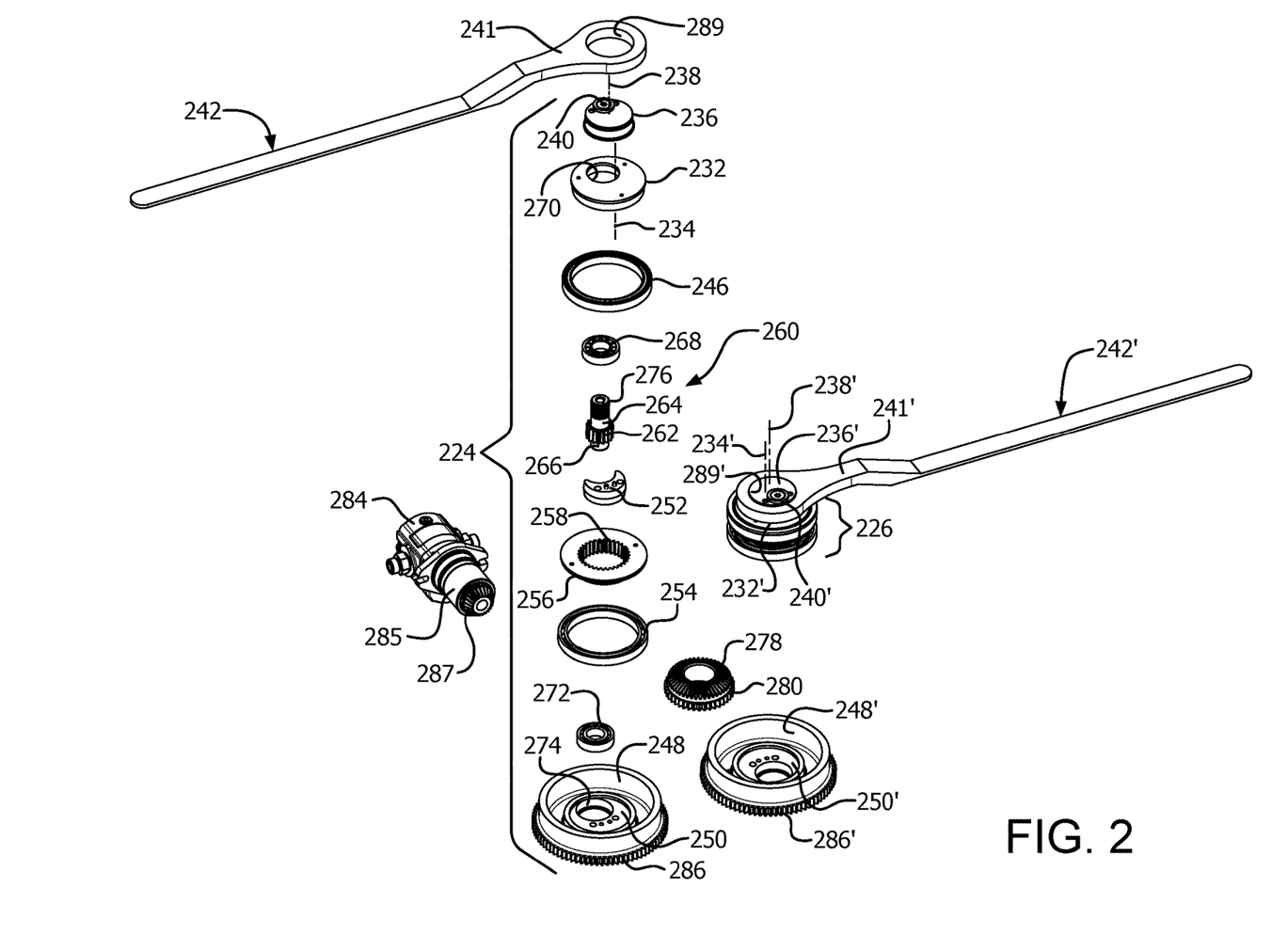
FIG. 2 is an exploded perspective view of a knife drive assembly in accordance with the subject disclosure suitable for use with the header of FIG. 1.

FIG. 2 depicts both an exploded perspective view of the first epicyclical drive 224 and an assembled perspective view of the second epicyclical drive 226. The first epicyclical drive 224 (wherein the second epicyclical drive 226 is constructed in a mirror image-like fashion) includes a first rotatable wheel 232 having a first vertical or substantially vertical rotational axis 234. The first epicyclical drive further includes a first disk 236 having a first vertical or substantially vertical eccentric axis 238 rotatable about the first vertical or substantially vertical rotational axis 234. A first fitting 240, described below, is received in and carried by the first disk 236. Operation of the first epicyclical drive results in rotational motion of the first disk 236, as well as linear oscillating or substantially linear oscillating motion of the first disk 236 in a direction transverse to the first vertical or substantially vertical rotational axis 234. The oscillating motion of the first disk 236 is in line with a longitudinal axis of the first cutter bar 342.

Likewise, the second epicyclical drive 226 includes a second rotatable wheel 232' having a second vertical or substantially vertical rotational axis 234'. The second epicyclical drive further includes a second disk 236' having a second vertical or substantially vertical eccentric axis 238' rotatable about the second vertical or substantially vertical rotational axis. A second fitting 240', described below, is received in and carried by the second disk 236. Operation of the second epicyclical drive results rotational motion of the second disk 236', as well as linear oscillating or substantially linear oscillating motion of the second disk in a direction transverse to the second vertical or substantially vertical rotational axis. So constructed and arranged, the second rotatable wheel 232' is adjacent the first rotatable wheel 232 and the second vertical or substantially vertical rotational axis 234' is parallel to and spaced from the first vertical or substantially vertical rotational axis 234. In addition, the first vertical or substantially vertical rotational axis of the first rotatable wheel is parallel to the first eccentric axis of the first disk, and the second vertical or substantially vertical rotational axis of the second rotatable wheel is parallel to the second eccentric axis of the second disk. In other words, the first and second eccentric axes are likewise vertical or substantially vertical.

The first rotatable wheel 232 is mounted for rotation on an outer bearing or bushing 246 which is seated in a first upwardly facing opening 248 of a first lower rotatable wheel 250. The first rotatable wheel 232 is affixed for rotation to the first lower rotatable wheel 250 via a generally crescent-shaped connector 252 by fasteners such as screws, bolts, or the like. The first lower rotatable wheel 250 is mounted for rotation in a lower outer bearing or bushing 254. Situated between the first rotatable wheel 232 and the first lower rotatable wheel 250 is a stationary central gear 256 having internal gear teeth 258. A shaft 260 has external gear teeth 262 adapted to matingly engage the internal gear teeth 258 of the central gear 256. Shaft 260 has portions 264, 266 that respectively rotate in an upper inner bearing or bushing 268 which resides in an opening 270 in the first rotatable wheel 232 and a lower inner bearing or bushing 272 which resides in an opening 274 in the first lower rotatable wheel 250. The upper end of the shaft 260 has a splined or toothed exterior 276 that is adapted to matingly engage a similarly splined or toothed interior of the first fitting 240, and the shaft 260 is secured to the first fitting 240 by a bolt or the like. It is seen in FIG. 2 that the second epicyclical drive 226 includes a second lower rotatable wheel 250' having a second upwardly facing opening 248' for receiving the assembled components of the second epicyclical drive.

Movement of the several components of the first epicyclical drive 224 is as follows. A suitable drive mechanism 284 such as the illustrated fluid motor, a drive shaft, a power take-off (PTO) shaft, an electric motor, belts, chains or a combination of such drives includes a drive shaft 285 having a drive gear 287, e.g. a bevel gear. As shown in FIG. 2, the drive mechanism extends between and is operatively engaged with the first and second rotatable wheels 232, 232'. The drive shaft 285, via the gear 287, engages and rotates a gear 278, e.g. a bevel gear, in a first direction. Affixed to the gear 278 is a gear 280, e.g., a spur gear, which engages and drives a first driven gear 286 operatively connected to the first rotatable wheel 232. More particularly, the first driven gear 286 is affixed to the first lower rotatable wheel 250 and is driven by gear 280 causing rotation thereof as well as the first rotatable wheel 232 in a direction opposite the first direction about the first vertical or substantially vertical rotational axis 234. As a result, the shaft 260 is carried by the upper and lower inner bearings or bushings 268, 272 residing in openings 270, 274 in the first rotatable wheel 232 and the first lower rotatable wheel 250 whereby the shaft 260 is caused to orbit about the first substantially vertical rotational axis 234. As the shaft 260 orbits about the first substantially vertical rotational axis 234, its gear teeth 262 engage gear teeth 258 of the stationary central gear 256 causing counter-rotation of the shaft 260 and the first disk 236 engaged therewith via the first fitting 240. Thus, as the first disk 236 rotates, it exhibits a linear oscillating or substantially linear oscillating motion in a direction transverse to the first substantially vertical rotational axis 234.

Operation of the second epicyclical drive 226 produces an identical but opposite oscillating motion in its second disk 236'. That is, the gear 280 rotates in a first direction and engages and drives a second driven gear 286' operatively connected to the second rotatable wheel 232'. More particularly, the second driven gear 286' is affixed to the second lower rotatable wheel 250' and is driven by gear 280 causing rotation thereof as well as the second rotatable wheel 232' in a direction opposite or substantially opposite the first direction about the second vertical or substantially vertical rotational axis 234'. Further, the unillustrated components of the second epicyclical drive 226 move in directions opposite their counterparts in the first epicyclical drive 224. Thus, the first and second disks 236, 236' of the first and second epicyclical drives are configured to oscillate in opposing directions and in a direction along a single plane. Consequently, at one extreme in the motion of the first and second epicyclical drives 224, 226, the first and second disks 236, 236' are at a minimum spaced apart distance from one another and at the opposite extreme the first and second disks 236, 236' are at a maximum spaced apart distance from one another for purposes of vibration cancellation. As is known in the art, vibration causes wear and tear on the various moving components of a cutter bar knife drive assembly. Thus, the present construction effectively minimizes vibration thereby effectively reducing harmful wear and tear.

In order to achieve effective vibration cancellation, the first and second epicyclical drives 224, 226 are timed such that the cutter bars 342, 342' have substantially equal and opposite motions. The driven gear 278 and the gear 280 affixed thereto provide a timing coupling suitable to achieve this motion. In other words, the oscillating motions of the first and second disks 236, 236' are configured to coincide with one another to effectuate vibration cancellation between the first and second cutter bars. Accordingly, when connected to cutter bar knife heads 241, 241' the disks 236, 236' of the first and second epicyclical drives 224, 226 move the cutter bars back and forth in horizontal or substantially horizontal motion as the cutting knives of the cutter bars cut crop while the agricultural harvester 100 and header 102 move forwardly over the crop.

The first and second cutter bars are configured, e.g., as shown in FIGS. 3 and 4. The first cutter bar 342 extends in a direction transverse to the first vertical or substantially vertical rotational axis 234, and the second cutter bar 342' extends in a direction transverse to the second vertical or substantially vertical rotational axis 234' opposite the first cutter bar. In this way, the oscillating motion of the first disk 236 is in line with a longitudinal axis of the first cutter bar 342 and the oscillating motion of the second disk 236' is in line with a longitudinal axis of the second cutter bar 342'.

Referring to FIGS. 2-4, the first rotatable wheel 232 is adjacent to the first cutter bar 342 and the second rotatable wheel 232' is adjacent to the second cutter bar 342'. Further, the medial ends of the first and second cutter bars 342, 342' at the cutter bar knife heads 241, 241' are formed with circular openings 289, 289', respectively, which rotatably receive the first and second disks 236, 236'. In this way, the first and second cutter bars are directly connected to and moved by the first and second disks 236, 236', respectively.

In addition, the first and second vertical or substantially vertical rotational axes of the first and second epicyclical drives 224, 226 extend perpendicular or substantially perpendicular to the cutter bars 342, 342' of the header 102. In other words, the vertical or substantially vertical rotational axes 234, 234' of the epicyclical drives face an upwardly or substantially upwardly direction whereby the first rotatable wheels 232, 232' are oriented horizontally or substantially horizontally, i.e., their rotational axes being vertical or substantially vertical. In short, the epicyclical drives 224, 226 face an upwardly direction.

As shown in FIG. 3, the epicyclical drives 224, 226 are mounted centrally along the header frame. It is understood however that the epicyclical drives may be mounted to the header frame at a distance spaced from the center of the header. The header comprises at least one conveyor supported by the header frame for transporting cut crop from the cutter bars to the feederhouse 106. In the illustrated example, the at least one conveyor is an infeed draper conveyor 390 and/or a lateral draper conveyor 392 the functions and operations of which are well known in the art. The epicyclical drives 224, 226 are positioned between the first and second cutter bars 342, 342' and the conveyor, e.g. the infeed draper conveyor 390. It is understood, however, that the epicyclical drives may be positioned between the first and second cutter bars and one or the other of the lateral draper conveyors 392.

As shown in FIGS. 3 and 4, the header further comprises a central cutter bar 294 adjacent the epicyclical drives 224, 226. According to an aspect, the central cutter bar has a longitudinal extent greater than a width of the epicyclical drives and positioned between the first and second cutter bars. FIG. 3 reveals that cutter bars 342, 342' overlap the cutting region of the central cutter bar 294 to assure gapless cutting of crop across the width of the header 102. FIG. 4 reveals that cutter bars 342, 342' include sloped portions 293, 293', respectively, located adjacent the medial ends of the cutter bars for providing vertical clearance to accommodate the housing 322 as the cutter bars oscillate back and forth.

It is understood that while the epicyclical drives 224, 226 have been described above as being directly supported by the frame 103, the subject disclosure is not so limited. That is, the epicyclical drives can be indirectly supported by the frame. For example, the epicyclical drives can be carried by pivoting flex arms that are themselves connected to the frame.

According to the exemplary embodiments of the subject disclosure, the epicyclical drives 224, 226 are directly connected to and move their respective cutter bars without any intervening structures. In other words, the cutter bars directly engage the first and second disks 236, 236' of the epicyclical drives at the circular openings 289, 289'. This advantageously results in a compact arrangement of parts which avoids the need for drive elements or other intervening structure to span a distance between the epicyclical drives and the cutter bars. Consequently, moments or other forces that can lead to detrimental stresses in the epicyclical drives are minimized. Stated differently, the direct connection of the epicyclical drives 224, 226 to the first and second cutter bars minimizes fatigue caused by moments arising from arms extending from epicyclical drives to the cutter bars as is the case with conventional epicyclical knife drives.

Additionally, the assembly has less mass and is lighter in weight than conventional designs which is advantageous because the combine requires less energy to lift the header and there is less mass to float on the ground thereby reducing the likelihood of the cutter bars digging into the ground during operation.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

I claim:

1. A header for an agricultural harvester comprising:
a frame;
an epicyclical drive supported by the frame, the epicyclical drive including:
 a first rotatable wheel having a first substantially vertical rotational axis, and
 a first disk having a first eccentric axis rotatable about the first substantially vertical rotational axis, wherein operation of the epicyclical drive results in oscillating motion of the first disk in a direction transverse to the first substantially vertical rotational axis; and
a first cutter bar directly connected to the first disk extending in a direction substantially transverse to the first substantially vertical rotational axis.

2. The header of claim 1, wherein the epicyclical drive further includes:
a second rotatable wheel having a second substantially vertical rotational axis; and
a second disk having a second eccentric axis rotatable about the second substantially vertical rotational axis, wherein operation of the epicyclical drive results in oscillating motion of the second disk in a direction transverse to the second substantially vertical rotational axis; and
wherein the header further comprises a second cutter bar directly connected to the second disk extending in a direction substantially transverse to the second substantially vertical rotational axis.

3. The header of claim 1, wherein the epicyclical drive is mounted centrally along the frame.

4. The header of claim 2, wherein the second substantially vertical rotational axis is substantially parallel to and spaced from the first substantially vertical rotational axis.

5. The header of claim 2, wherein the first and second disks are configured to oscillate in opposing directions.

6. The header of claim 1, wherein the first rotatable wheel is adjacent to the first cutter bar.

7. The header of claim 2, wherein the first and second disks oscillate in a direction along a single plane.

8. The header of claim 2, wherein the first substantially vertical rotational axis of the first rotatable wheel is parallel to the first eccentric axis of the first disk, and wherein the second substantially vertical rotational axis of the second rotatable wheel is parallel to the second eccentric axis of the second disk.

9. The header of claim 1, wherein the first eccentric axis is substantially vertical.

10. The header of claim 2, wherein the second rotatable wheel is adjacent the first rotatable wheel.

11. The header of claim 1, further comprising a central cutter bar adjacent the epicyclical drive.

12. The header of claim 11, wherein the central cutter bar has a longitudinal extent greater than a width of the epicyclical drive and positioned between the first and second cutter bars.

13. The header of claim 1, wherein the first rotatable wheel is adjacent to the first cutter bar.

14. The header of claim 1, wherein the epicyclical drive faces an upwardly direction.

15. The header of claim 1, further comprising a conveyor supported by the frame, and wherein the epicyclical drive is positioned between the first cutter bar and the conveyor.

16. The header of claim 15, wherein the conveyor is an infeed draper conveyor or a lateral draper conveyor.

17. The header of claim 2, wherein the epicyclical drive includes a drive mechanism extending between and operatively engaged with the first and second rotatable wheels.

18. The header of claim 17, wherein the drive mechanism includes a drive shaft engaged with a first driven gear operatively connected to the first rotatable wheel and a second driven gear operatively connected to the second rotatable wheel.

19. The header of claim 1, wherein the first rotatable wheel is substantially inline with a longitudinal axis of the first cutter bar.

20. The header of claim 11, wherein the central cutter bar is positioned below the first cutter bar.

\* \* \* \* \*